United States Patent [19]

Otani et al.

[11] Patent Number: 4,780,887
[45] Date of Patent: Oct. 25, 1988

[54] CARRIER RECOVERY CIRCUITRY IMMUNE TO INTERBURST FREQUENCY VARIATIONS

[75] Inventors: Susumu Otani; Yoshio Tanimoto; Shousei Yoshida, all of Tokyo, Japan

[73] Assignee: NEC Corporation, Japan

[21] Appl. No.: 87,319

[22] Filed: Aug. 20, 1987

[30] Foreign Application Priority Data

Aug. 21, 1986 [JP] Japan .................. 61-196117
Aug. 21, 1986 [JP] Japan .................. 61-196118

[51] Int. Cl.⁴ .................................. H04L 27/14
[52] U.S. Cl. .............................. 375/80; 375/82; 375/120; 329/50
[58] Field of Search ............... 375/80, 81, 82, 119, 375/120; 329/50, 104, 110

[56] References Cited

U.S. PATENT DOCUMENTS

| | | | |
|---|---|---|---|
| 3,746,994 | 7/1973 | Kramer | 375/82 |
| 4,246,653 | 1/1981 | Malm | 375/82 |
| 4,458,356 | 7/1984 | Toy | 375/120 |
| 4,516,079 | 5/1985 | York | 329/104 |
| 4,591,795 | 5/1986 | Tanimoto et al. | 329/50 |
| 4,642,573 | 2/1987 | Noda et al. | 275/81 |
| 4,704,582 | 11/1987 | Dixon et al. | 375/82 |

Primary Examiner—Robert L. Griffin
Assistant Examiner—Stephen Chin
Attorney, Agent, or Firm—Ostrolenk, Faber, Gerb & Soffen

[57] ABSTRACT

A carrier recovery circuit comprises first and second mixers for mixing a received PSK signal with first and second reference frequency signals. A remodulator extracts a preamble from each burst of the PSK signal and supplies the extracted carrier to a carrier recovery means to cause it to derive a reference carrier from the extracted preamble. A phase detector is connected to the outputs of the first and second mixers for detecting a phase difference between the PSK signal and the reference carrier, the detected phase difference being applied to a resettable noise reduction circuit for reducing amplitude fluctuations contained in the phase difference, the noise reduction circuit being arranged to be reset in response to each of the bursts to discharge energy stored as a result of the noise reduction and eliminate interburst phase errors which occur as a result of interburst frequency variations. A variable phase shifter controls the phase of the reference carrier in accordance with the output of the noise eliminator and supplies quadrature versions of the phase controlled carrier to the first and second mixers as the first and second reference frequency signals.

6 Claims, 4 Drawing Sheets

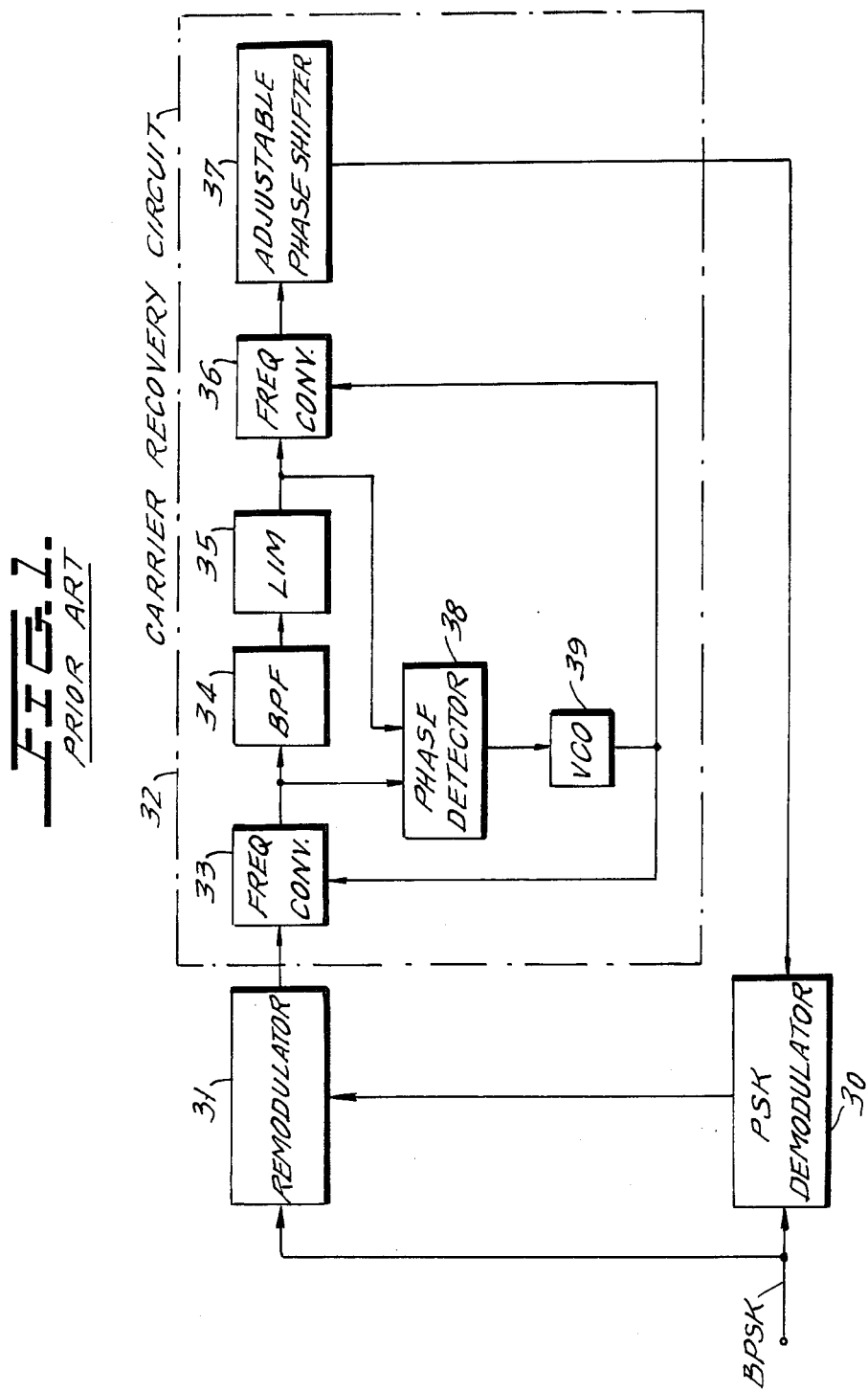

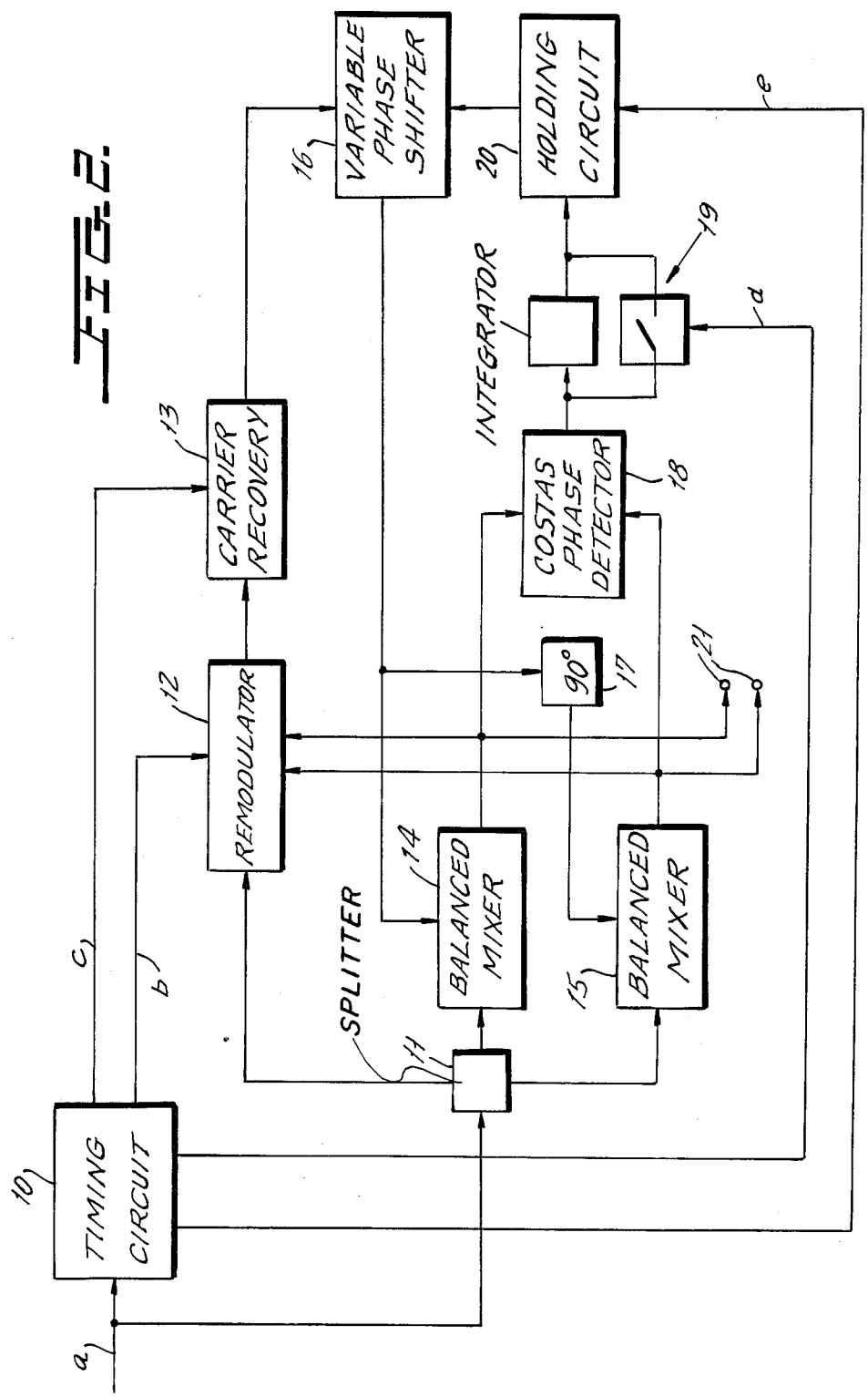

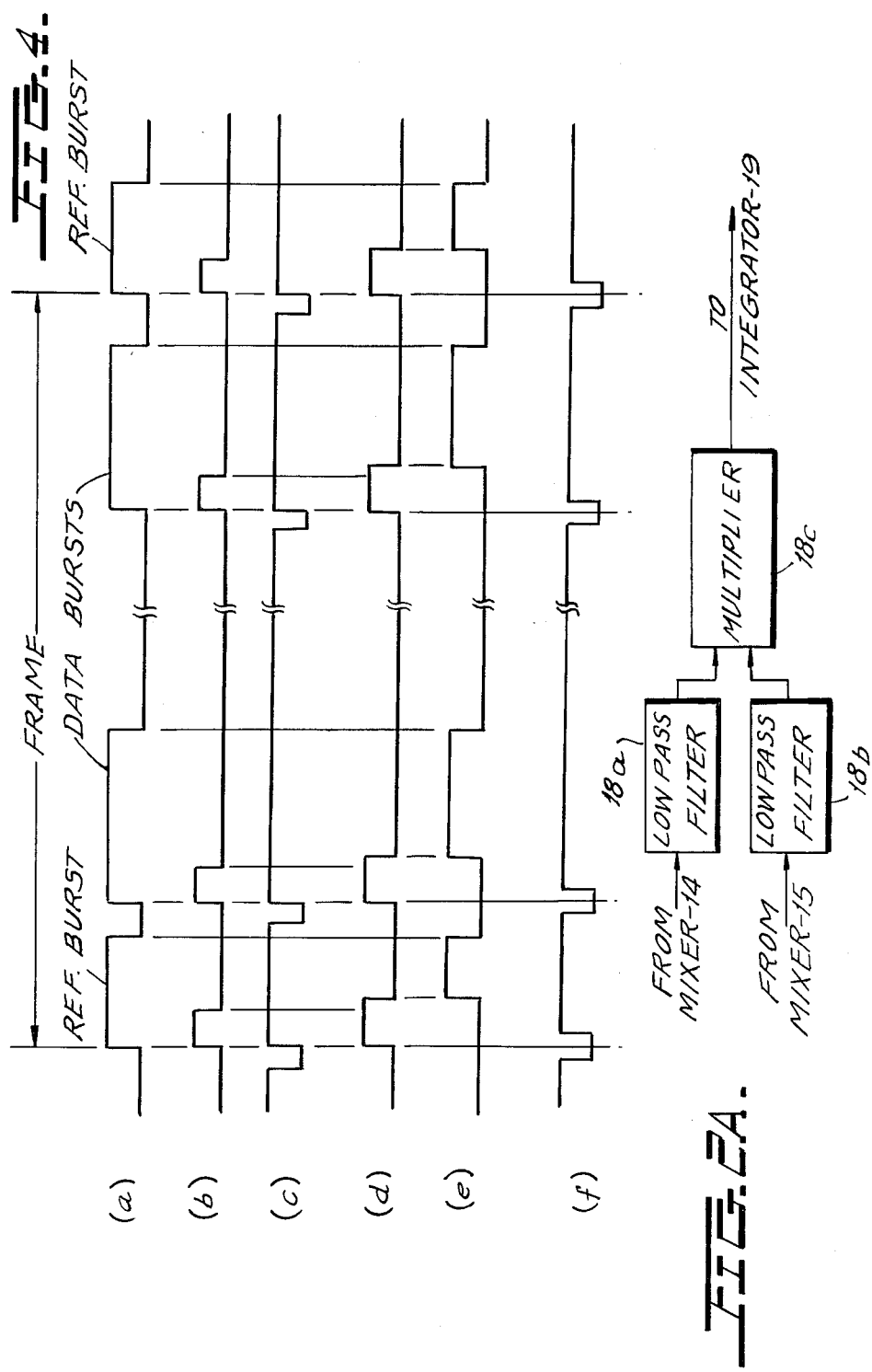

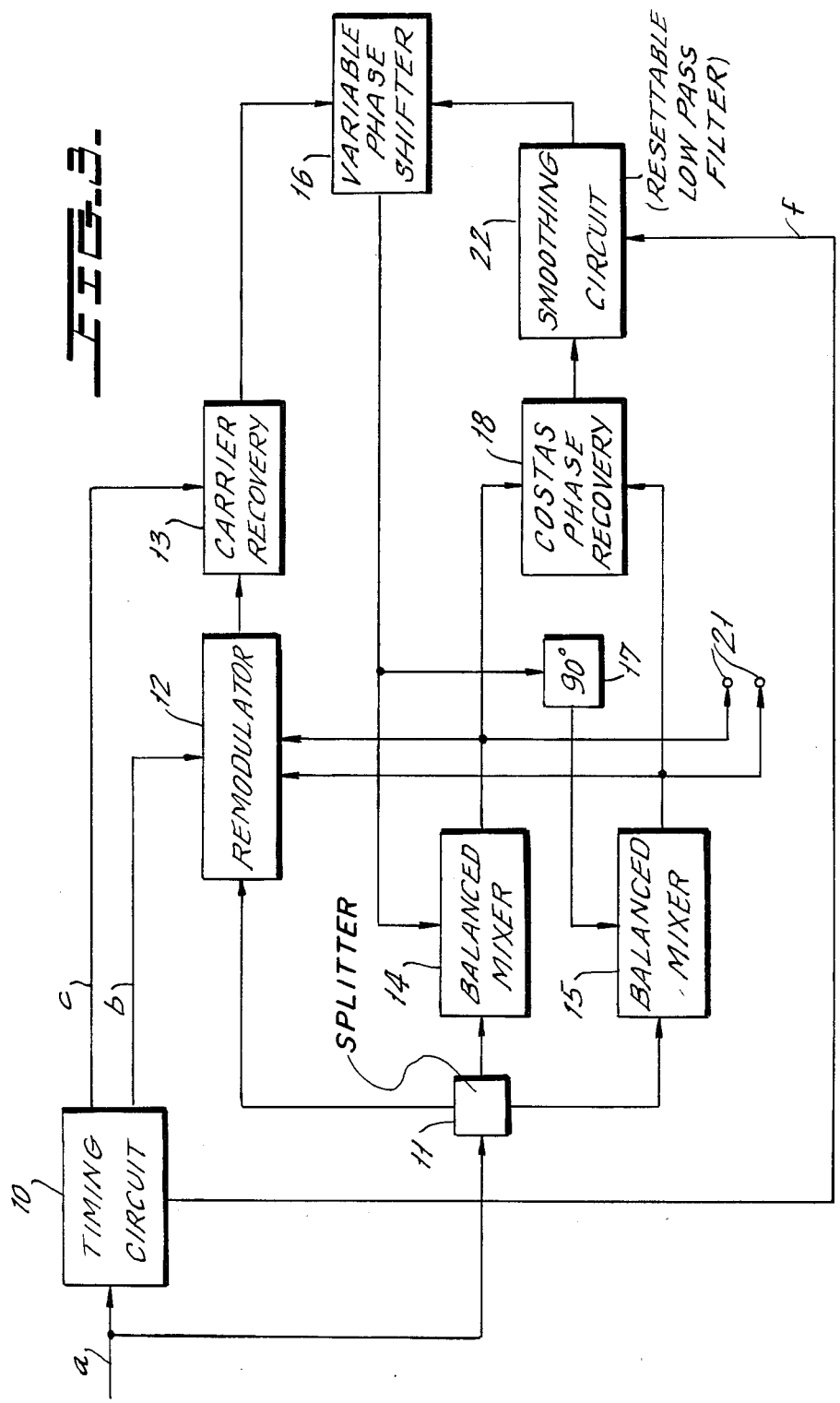

CARRIER RECOVERY CIRCUITRY IMMUNE TO INTERBURST FREQUENCY VARIATIONS

BACKGROUND OF THE INVENTION

The present invention relates to a carrier recovery circuit for recovering the carrier of a PSK (phase shift keying) signal employed in time division multiple access (TDMA) communication systems.

In a prior art carrier recovery circuit for recovering the carrier of a received PSK modulated signal, a carrier component is extracted from the received signal and converted to a lower frequency. The extracted carrier is bandwidth and amplitude limited by a narrow pass-band filter and an amplitude limiter to eliminate unwanted signals and amplitude fluctuations and is reconverted to the original frequency for application to a PSK demodulator as a reference carrier through a phase shifter. A phase comparator detects a phase difference between the input and output of the bandwidth and amplitude limiters and controls a voltage controlled oscillator which generates the variable frequency signal necessary for the frequency conversion and reconversion. However, due to slow response characteristic, the prior art carrier recovery circuit is not capable of responding to interburst frequency variations, resulting in an increase in bit error rate.

SUMMARY OF THE INVENTION

It is therefore an object of the present invention to provide a carrier recovery circuit for recovering the carrier of a received PSK signal, the circuit being capable of quickly responding to frequency variations which occur between successive bursts of the PSK signal.

According to the invention, a carrier recovery circuit comprises first and second mixers for mixing the PSK signal with first and second reference frequency signals. A remodulator extracts a carrier recovery portion of the PSK signal from each burst of the PSK signal and supplies the extracted carrier to carrier recovery means to cause it to generate a reference burst carrier. A phase detector is connected to the outputs of the first and second mixers for detecting a phase difference between the PSK signal and the reference carrier, the detected phase difference being applied to a noise reduction circuit for reducing amplitude fluctuations of the phase difference signal, the noise reduction circuit being arranged to be reset in response to each of the bursts to discharge energy stored as a result of the noise reduction and eliminate interburst phase errors which occur as a result of interburst frequency variations. A variable phase shifter controls the phase of the reference carrier in accordance with the output of the noise eliminator and supplies quadrature versions of the phase controlled carrier to the first and second mixers as said first and second reference frequency signals. The carrier recovery means includes an automatic frequency control loop which generates the reference burst carrier. Preferably, the AFC loop is reset in response to each burst to discharge energy stored in the previous burst in order to reduce interburst interference.

Specifically, the noise eliminator comprises a resettable integrator and a holding circuit which operate during mutually exclusive times of each burst for generating a time integral value of the phase difference to eliminate noise and subsequently holding and applying the time integral value to the variable phase shifter. Alternatively, the noise eliminator comprises a burst-responsive resettable smoothing circuit which can be implemented by a resettable low-pass filter.

BRIEF DESCRIPTION OF THE DRAWINGS

The present invention will be described in further detail with reference to the accompanying drawings, in which:

FIG. 1 is a block diagram of a prior art carrier recovery circuit;

FIG. 2 is a block diagram of a carrier recovery circuit according to an embodiment of the invention;

FIG. 2A is a block diagram of the preferred structure of the phase detector of FIG. 2;

FIG. 3 is a block diagram of an alternative embodiment of the invention; and

FIG. 4 is a timing diagram associated with the embodiments of FIGS. 2 and 3.

DETAILED DESCRIPTION

Before describing the present invention, it is appropriate to provide a full description of the prior art carrier recovery circuit with reference to FIG. 1. A received BPSK signal is applied to a PSK demodulator 30 which takes another input from the output of a carrier recovery circuit 32 and demodulates the received signal. The demodulated signal is applied to a remodulator 31 where it is mixed with the received BPSK signal to detect the carrier component at frequency fc of the received signal and converted to a carrier having a center frequency fc−fv by a frequency converter 33 of the carrier recovery circuit 32 by mixing the output of a voltage controlled oscillator 39. This carrier is bandlimited by a narrow band-pass filter 34 to remove unwanted frequency components and amplitude limited by an amplitude limiter 35 to remove amplitude fluctuations and fed to a frequency converter 36 where it is converted to the original frequency fc and passed through a phase shifter 37 so that an optimum phase relationship is maintained between the received BPSK signal and the recovered carrier to minimize bit error rate. Voltage controlled oscillator 39 is controlled by the output of a phase detector 38 which detects the phase difference between the output of frequency converter 33 and the input of frequency converter 36.

If some perturbation should cause the frequency of the received BPSK signal to differ by an amount Δf from the intended value, the automatic frequency control responds to it by reducing phase shifts which would otherwise occur at the outputs of band-pass filter 34 and amplitude limiter 35. However, because of the inherent tendency of the frequency control loop, the prior art carrier recovery circuit is unable to respond quickly to rapid frequency variations which occur between successive bursts. Therefore, it synchronizes to an average value fav of the individual frequencies of the bursts. As a result, the carrier of the received BPSK signal experiences a phase shift of Δf·KB (where KB represents the phase characteristics of the band-pass filter 34 and limiter 35 and given by rad/Hz) in response to a frequency deviation Δf with respect to the average frequency fav. This phase shift results in the degradation of the bit error performance of the system.

Referring now to FIG. 2, there is shown a circuit for recovering the carrier of a binary PSK received signal carrier according to an embodiment of the present invention. The received BPSK signal is applied to a timing circuit 10 and to a splitter 11. As illustrated in FIG.

4, the input signal has a waveform a which is a series of frames each containing a reference burst and subsequent data bursts. Each burst begins with a preamble word containing a carrier recovery field, a bit timing recovery field and a unique word, and terminates with a data field in which information bits are inserted.

Timing circuit 10 generates a plurality of timing signals b, c, d and e as shown in FIG. 4. The timing signal b is a series of window pulses which are used for enabling a remodulator 12 to detect the carrier recovery field from the beginning of each burst and the timing signal c is low for a period prior to the leading edge of each burst for resetting a carrier recovery circuit 13 which includes an automatic frequency control loop and goes high for activating it during the period of each burst. Splitter 11 produces copies of the input signals and applies them to the remodulator 12, and first and second multipliers, or balanced mixers 14 and 15 which form part of a Costas loop. The output signals of the balanced mixers 14 and 15 are supplied to the remodulator 12 and to a Costas phase detector 18 and delivered through output terminals 21 to a bit recovery circuit, not shown.

Remodulator 12 extracts the carrier recovery field of each burst from the output of splitter 11 in response to the window pulse b by multiplying quadrature versions of the received BPSK signal with the outputs of mixers 14 and 15 and supplies the extracted carrier to the carrier recovery circuit 13. The automatic frequency control loop of carrier recovery circuit 13 is activated during each burst period to derive a reference carrier from the output of remodulator 12 and is reset to clear energy stored in the resonant circuit of the AFC loop when the timing signal c goes low. This is advantageous in that it minimizes the effect of undesirable interburst interference on the suppression of long-term frequency variations of the recovered carrier resulting from the corresponding frequency variations of the received PSK signal.

The output of the carrier recovery circuit 13 is fed to a variable phase shifter 16 which in turn supplies a reference carrier to the balanced mixers 14 and 15 with a 90-degree phase difference introduced therebetween by a 90-degree phase shifter 17. A phase difference between the received BPSK signal and the recovered carrier is detected from the outputs of the balanced mixers 14 and 15 by Costas phase detector 18. Specifically, the Costas phase detector 18 (FIG. 2A) comprises two low-pass filters 18a and 19a coupled respectively to the outputs of the balanced mixers 14, 15 to remove the double frequency terms generated by multiplications by mixers 14, 15. A multiplier 18c is included in the phase detector 18 to multiply the outputs of the low-pass filters. The phase difference manifests itself by a change in the output of this multiplier, which is applied to a resettable integrator 19 to suppress amplitude fluctuations contained in the phase difference signal. The output of integrator 19 is supplied to a holding circuit 20 which controls the variable phase shifter 16.

The timing signal d is one which goes high immediately following the beginning of each burst and stays high for a duration slightly longer than the duration of the window pulse b for enabling the integrator 19 to perform time integration on the noise-containing phase difference signal and switches to a low voltage level for resetting the integrator 19. The timing signal e stays low for a duration corresponding to the preamble word of each burst for causing the holding circuit 20 to supply an arbitrarily determined voltage to the variable phase shifter 16 and stays high during a period corresponding to the data field of each burst for enabling it to hold the integrator output.

Integrator 19 filters the phase difference signal and the noise contained therein during the period when the timing signal d is high such that the signal voltage increases linearly with time, while the standard deviation (rms value) of the noise increases more slowly. Thus, the integrator enhances the signal relative to the noise, and this enhancement increases with time. Integrator 19 is reset when the timing signal d is low to discharge energy stored during the period prior to the commencement of the time integration, thus eliminating interburst phase errors caused by interburst frequency variations. Holding circuit 20 holds the output of integrator during the data field of each burst and controls the phase shifter 16 with the time integral value of a phase difference which is both free from noise and interburst errors. As a result, phase shifts of the recovered carrier caused by interburst frequency variations can be reduced to a minimum. It is seen that a phase locked loop is formed by the balanced mixers 14, 15, phase shifter 17, phase detector 18, integrator 19, holding circuit 20 and variable phase shifter 16. It is known that a phase locked loop for binary PSK signals is unstable for phase differences ±90 degrees and a phase locked loop for quadrature PSK signals is unstable for phase differences of ±45 degrees. However, it is found that the initial phase difference is as low as $\Delta f \cdot KB + 2\pi \Delta f \cdot t$ (where t represents the delay time involved in the remodulator 12 and carrier recovery circuit 13) which is sufficient to prevent the phase locked loop from becoming unstable. More specifically, assume that the remodulator 12 has a modulation rate fs and a carrier recovery bandwidth (3 dB) of fs/100. Since the frequency deviation $\Delta f$ is normally smaller than than fs/1000, the initial phase difference is given by:

$$\tan^{-1}(fs/1000)/(fs/200) = \tan^{-1}(0.2) = 11 \text{ degrees}$$

FIG. 3 is an illustration of an alternative embodiment of the invention which is similar to the first embodiment with the exception that it includes a resettable smoothing circuit 22 instead of the integrator and holding circuit of FIG. 2 and the timing circuit 10 generates a timing signal f instead of the timing signals d and e. This timing signal f is a series of pulses as shown in FIG. 4, each pulse occurring in synchronism with the leading edge of each of the reference and data bursts. Smoothing circuit 22 may comprises a low-pass filter, preferably a digital low-pass filter, to smooth out the output of Costas phase detector 18 during the data field of each burst to reduce noise contained in the phase difference signal and is arranged to be reset in response to the timing signal f just prior to the smoothing of the phase difference signal to eliminate interburst phase errors caused by interburst frequency variations. Variable phase shifter 16 is controlled by the smoothed phase difference signal.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A carrier recovery circuit for recovering a carrier from a PSK (phase shift keying) modulated signal having a-series of bursts each containing a preamble, comprising:

first and second mixer means for mixing said PSK signal with first and second reference frequency signals;

remodulator means for receiving said PSK signal and the outputs of said first and second mixer means for extracting said preamble from each burst of said PSK signal;

carrier recovery means connected to the output of said remodulator means for deriving a reference carrier from said extracted preamble;

phase detector means connected to the outputs of said first and second mixer means for detecting a phase difference between said PSK signal and said reference carrier;

noise reducing means connected to the output of said phase detector means for reducing amplitude fluctuations contained in said phase difference exclusively during the presence of each burst and discharging energy stored as a result of the noise reduction during a period subsequent to the noise reduction; and variable phase shifter means for controlling the phase of said reference carrier in accordance with the output of said noise reducing means and supplying quadrature versions of the phase controlled reference carrier to said first and second mixer means as said first and second reference frequency signals.

2. A carrier recovery circuit as claimed in claim 1, wherein said noise reducing means comprises:

timing means for generating a first timing signal which occurs during an initial period of each of said bursts and a second timing signal which occurs during a subsequent period of each burst;

resettable integrator means connected to the output of said phase detector means for integrating said phase difference in response to said first timing signal and clearing the integrated phase difference in response to said second timing signal; and holding means connected to the output of said integrator means for applying the integrated phase difference to said variable phase shifter means in response to said second timing signal.

3. A carrier recovery circuit as claimed in claim 1, wherein said noise reducing means comprises:

timing means for generating a timing signal in response to each of said bursts; and a resettable smoothing circuit arranged to be reset by said timing signal for smoothing said phase difference and applying the smoothed phase difference to said variable phase shifter means.

4. A carrier recovery circuit as claimed in claim 3, wherein said smoothing circuit comprises a resettable low-pass filter.

5. A carrier recovery circuit as claimed in claim 1, wherein said carrier recovery means includes an automatic frequency control loop for generating said reference carrier and means for resetting the automatic frequency control loop in response to each of said bursts to cause said automatic frequency control loop to initiate the generation of said reference carrier.

6. A carrier recovery circuit as claimed in claim 1, wherein said phase detector means comprises a pair of low-pass filter means connected to the outputs of said first and second mixer means and a multiplier for multiplying the outputs of said low-pass filter means to detect said phase difference.

* * * * *